A. H. TAYLOR.
WATER SPRAYING DEVICE FOR PNEUMATIC TOOLS.
APPLICATION FILED FEB. 21, 1908.
905,387.
Patented Dec. 1, 1908.
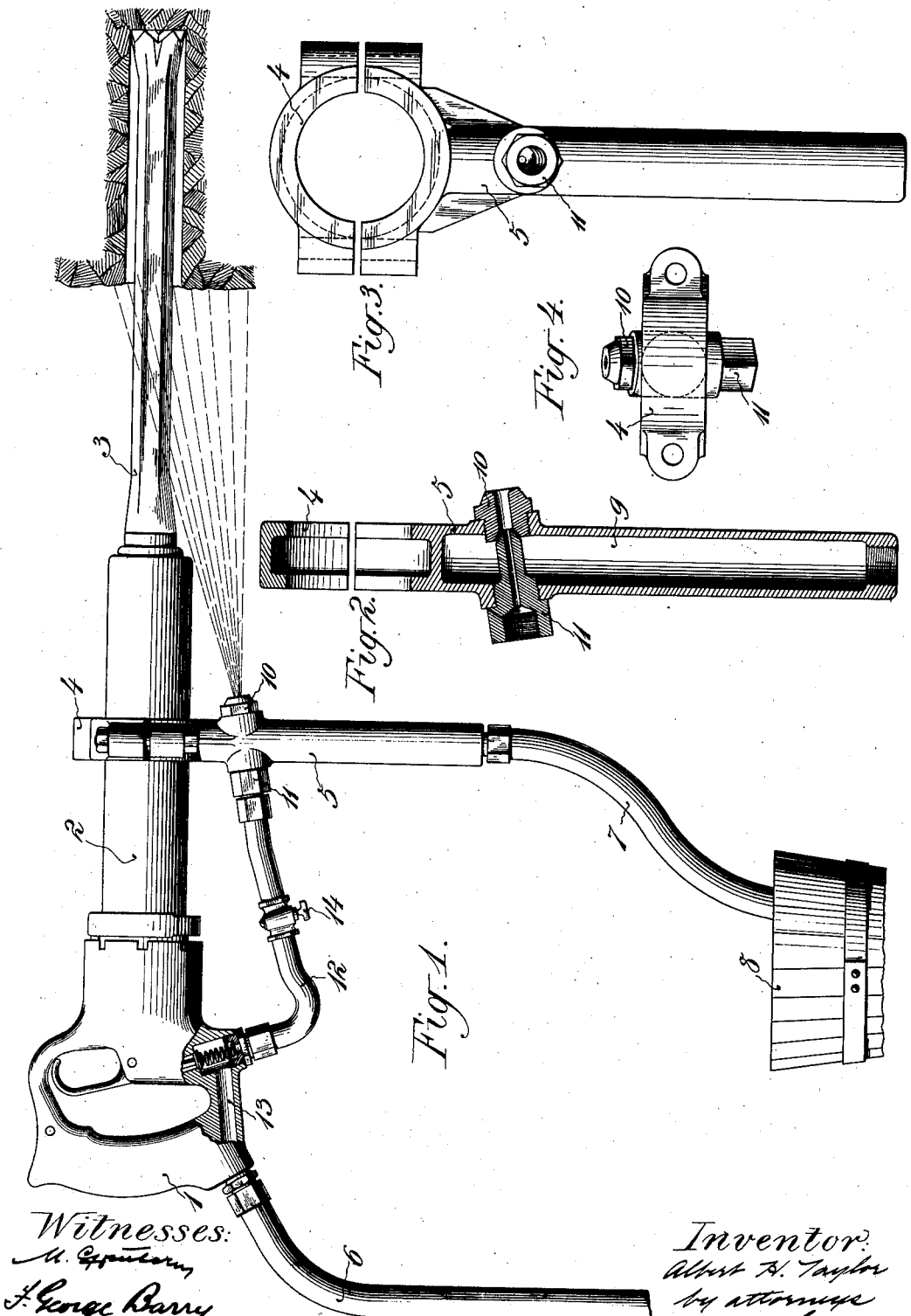

UNITED STATES PATENT OFFICE.

ALBERT H. TAYLOR, OF EASTON, PENNSYLVANIA, ASSIGNOR TO INGERSOLL-RAND COMPANY, OF NEW YORK, N. Y., A CORPORATION OF NEW JERSEY.

WATER-SPRAYING DEVICE FOR PNEUMATIC TOOLS.

No. 905,387.  Specification of Letters Patent.  Patented Dec. 1, 1908.

Application filed February 21, 1908. Serial No. 416,972.

*To all whom it may concern:*

Be it known that I, ALBERT H. TAYLOR, a citizen of the United States, and resident of Easton, in the county of Northampton and State of Pennsylvania, have invented a new and useful Improvement in Water-Spraying Devices for Pneumatic Tools, of which the following is a specification.

My invention relates to a water spraying device for use in connection with pneumatic tools and it is directed more particularly to a water spraying device for use in connection with hammer drills, where it is desirable that the dust which is cut by the drill steel should be laid by coming in contact with the spray of water, as the dust leaves the hole being bored.

In ordinary practice where air is used to clean the hole being bored, the dust is blown out of the hole and mixes with the atmosphere, thus rendering the air unfit for breathing and dangerous for the operator, especially so in closed workings, such as mines and tunnels.

The object of my invention is to provide an ejector which is connected to a water supply and also to the air supply, whereby a jet of air issuing from the force nozzle of the ejector will draw water from the water supply and force it through the discharge nozzle of the ejector in the form of a spray of water which may be directed against the mouth of the hole being bored, thus dampening the dust particles before they have time to mix with the air and causing the particles to be precipitated.

A practical embodiment of my invention is represented in the accompanying drawings in which.

Figure 1 is a view in side elevation, partially in section, showing a hand pneumatic tool of the hammer drill type with my water spraying device applied thereto, the parts being shown in position as in use. Fig. 2 is a longitudinal central section on an enlarged scale, through the rotating handle, Fig. 3 is an elevation of the same, and Fig. 4 is an end view of the rotating handle.

The water spraying device is herein shown as applied to a hammer drill of the well known axial valve type, the tool handle being denoted by 1; the cylinder or barrel, by 2; the drill steel, by 3; and the rotating handle, by 4, 5. The air supply pipe 6 leads to the tool handle 1 from any suitable source of supply, not shown herein.

A pipe 7 leads from a source of water supply, such, for instance, as a tub or cask 8, to the outer end of the member 5 of the rotating handle, which member is hollow to provide a water supply chamber 9 therein.

The ejector, carried by the rotating handle, comprises a discharge nozzle 10 in communication with the water supply chamber 9, and a force nozzle 11 in communication with the air supply for the tool. In the present instance, a pipe 12 is provided which leads from the tool handle 1 to the force nozzle 11 of the ejector, so that a jet of air may be directed into the discharge nozzle 10 for lifting the water from its source of supply and forcing it through the discharge nozzle in the form of spray, so directed as to strike the desired spot.

The air pipe 12 is in open communication with the air supply pipe 6, through the main air supply passage 13 in the tool handle. A cock 14 is provided in the pipe 12 for regulating the admission of air to the ejector.

In the form herein shown and described the arrangement of the ports is such that when the cock 14 is open, the water may be sprayed on to the desired spot whether the tool be operating or not.

While I have shown my invention in connection with a hammer drill, it is to be understood that I contemplate utilizing the same wherever it may be desirable for use.

What I claim is:

1. A water spraying device for pneumatic tools, comprising a hollow rotating handle communicating with a water supply, and an ejector carried by the handle, for spraying water on to the desired spot, said ejector having its discharge nozzle in communication with the interior of the handle and its force nozzle in communication with the air supply.

2. A water spraying device for pneumatic tools, comprising a hollow rotating handle communicating with a water supply, an ejector carried by the handle, for spraying water on to the desired spot, said ejector having its discharge nozzle in communication with the interior of the handle and its force nozzle in communication with the air supply, and means for regulating the admission of air to the force nozzle of the ejector.

3. A pneumatic tool comprising a handle, an air supply pipe leading thereto, a cylinder, a hollow rotating handle, a water supply pipe leading thereto, an ejector carried by the rotating handle having its discharge nozzle arranged to spray water on to the desired spot and an air pipe leading from the tool handle to the force nozzle of the ejector.

4. A pneumatic tool comprising a handle, an air supply pipe leading thereto, a cylinder, a hollow rotating handle, a water supply pipe leading thereto, an ejector carried by the rotating handle having its discharge nozzle arranged to spray water on to the desired spot, an air pipe leading from the tool handle to the force nozzle of the ejector, and a cock in said pipe for regulating the admission of air to said force nozzle.

5. A pneumatic tool comprising a handle having a main air supply passage therein, an air supply pipe leading to said passage in the handle, a cylinder, a hollow rotating handle, a water supply pipe leading thereto, an ejector carried by the rotating handle having its discharge nozzle arranged to spray the water on to the desired spot and an air pipe leading from the air supply passage in the tool handle to the force nozzle of the ejector.

6. A pneumatic tool comprising a handle having a main air supply passage therein, an air supply pipe leading to said passage in the handle, a cylinder, a hollow rotating handle, a water supply pipe leading thereto, an ejector carried by the rotating handle having its discharge nozzle arranged to spray the water on to the desired spot, an air pipe leading from the air supply passage in the tool handle to the force nozzle of the ejector, and a cock in said pipe for regulating the admission of air to the said force nozzle.

In testimony, that I claim the foregoing as my invention, I have signed my name in presence of two witnesses, this 19th day of February, 1908.

ALBERT H. TAYLOR

Witnesses:
WARD RAYMOND,
RUSSELL H. WILHELM.